Figure 1:
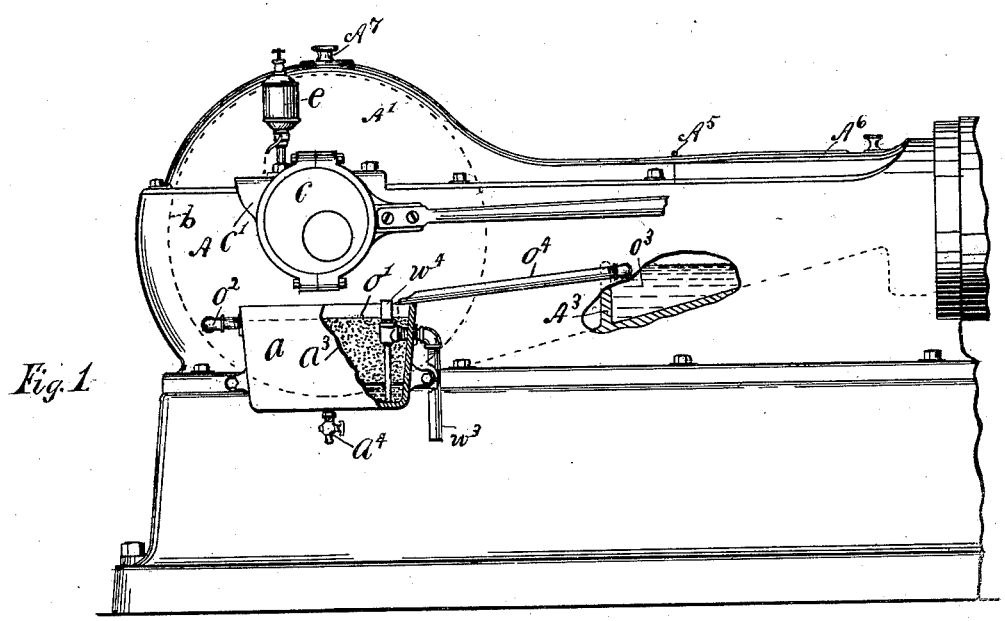

No. 696,919. Patented Apr. 8, 1902.
J. B. ALLFREE.
OIL FILTERING AND LUBRICATING APPARATUS.
(Application filed May 24, 1899.)

(No Model.) 2 Sheets—Sheet 1.

WITNESSES:
E. B. Hotzel
H. W. Williams

INVENTOR
James B. Allfree
BY
Abr. L. Teetor
ATTORNEY.

No. 696,919. Patented Apr. 8, 1902.
J. B. ALLFREE.
OIL FILTERING AND LUBRICATING APPARATUS.
(Application filed May 24, 1899.)
(No Model.) 2 Sheets—Sheet 2.

WITNESSES:
E. B. Hetzel
H. W. Williams

INVENTOR
James B. Allfree
BY
Abd. L. Teeter
ATTORNEY.

UNITED STATES PATENT OFFICE.

JAMES B. ALLFREE, OF INDIANAPOLIS, INDIANA.

OIL-FILTERING AND LUBRICATING APPARATUS.

SPECIFICATION forming part of Letters Patent No. 696,919, dated April 8, 1902.

Application filed May 24, 1899. Serial No. 717,980. (No model.)

*To all whom it may concern:*

Be it known that I, JAMES B. ALLFREE, a citizen of the United States, residing at Indianapolis, in the county of Marion and State of Indiana, have invented certain new and useful Improvements in Continuous Oil-Filtering and Lubricating Apparatus, of which the following specification is a full description.

My invention has for its object the continuous circulation of the oil of lubrication, the filtering of said oil during circulation, and the cooling of said oil during filtration, and I have provided in the present instance a suitable oil-cup to oil the eccentrics, whereby is furnished a sufficient surplus of oil to replenish the small percentage worn or exhausted in the lubrication of the engine, so as to keep up the volume of oil circulating through my apparatus, having arranged that the drip from said eccentric is caught by my filtering devices and purified with the oil in circulation. I attain these objects by providing an engine crank-case adapted to receive oil in any necessary quantity throughout the whole inclosure, that the lubrication may be thorough and that the oil may be collected without waste and returned again to follow continuously through the system, for which purpose I provide at a relatively high level a dam adapted to collect the oil that has been thrown over the moving parts of the engine, as described farther on, and from this collecting dam or reservoir I conduct the oil in suitable pipes or conduits to what I will for convenience call the "filtering-box," which I provide with filtering material and which is located at a lower level than said dam, so that the oil collected by said dam will flow of its own gravity into and through the said filtering-box. Within the crank-case and directly below the crank or crank-disk of the engine I provide a distributing-basin which is relatively at a lower level than the outlet provided in said filtering-box for the discharge of the purified oil therefrom, which will thus naturally flow into said distributing-basin. Near the bottom of said filtering-box I provide a perforated plate or screen, below which accumulates the water of condensation, and near the discharge end also of said filtering-box a perforated plate is provided, through which the oil passes after filtration, the filtering material being retained in the space formed above and by said bottom and end perforated plates, said filtering material being of any suitable substance, such as curled hair or cotton-waste. To remove the water of condensation, I provide a vertical adjustable trap-tube which has a suitable outlet near its top and extends downwardly through the bottom screen into said water-space, the construction of which is fully shown in the accompanying drawings, in which—

Figure 2:
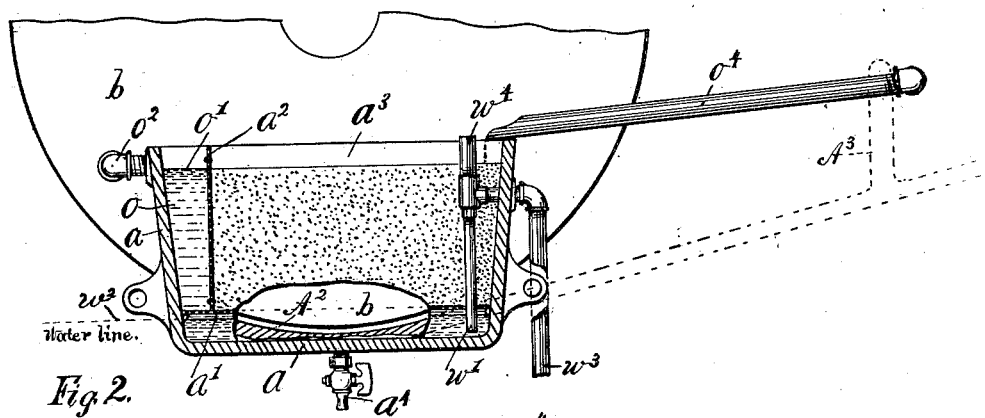
Figure 3:
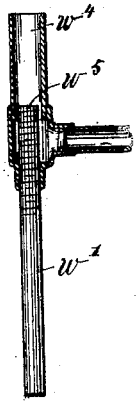
Figure 4:
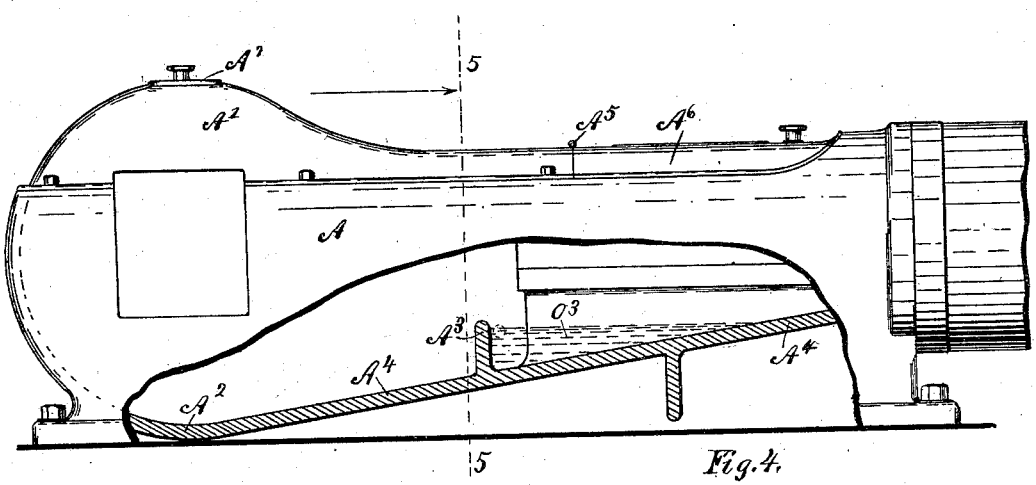
Figure 5:
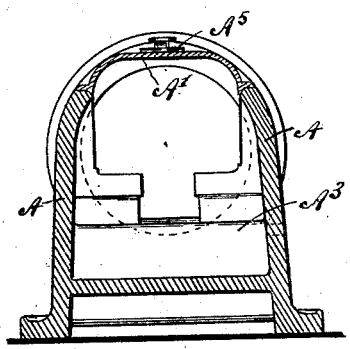

Figure 1 is a broken side elevation of a steam-engine. Fig. 2 is an enlarged detail, part-sectional, broken side view. Fig. 3 is an enlarged detail view of the adjustable trap-tube, partly in section and partly in elevation. Fig. 4 is a broken side view of an engine-bed. Fig. 5 is a vertical transverse section through line 5 5.

A represents the engine-bed, provided with close-fitting cover $A'$. At $A^2$ is the distributing-basin. At $A^3$ is provided an upwardly-projecting rib, forming the collecting-reservoir, formed on the slanting bottom $A^4$. At $A^5$ is hinged section $A^6$ of cover $A'$, providing ready access to the cross-head and guides.

$a$ is the filtering-box; $a'$ and $a^2$, said perforated plates; $a^3$, the filtering material. At $a^4$ is a cock, whereby all water may be withdrawn from said filtering-box. $w$ is a space below the plate $a'$, in which said water of condensation accumulates, rising and being discharged through the trap-tube $w'$ by the pressure of the oil in filtration, which approaches about the water-line $w^2$, the oil from filtration accumulating at $o$ rising to the height of $o'$, when it flows through pipe $o^2$ into said distributing-reservoir. The vertical adjustment of said trap-tube is accomplished by means of any suitable tool inserted down through the larger upwardly-projecting tube $w^4$ and into the slot $w^5$, provided therefor, by which means the height of oil-line $o'$ may be adjusted to suit the discharge at $o^2$.

$b$ is crank or crank-disk; $c$, the eccentrics, the yokes or straps of which are provided with elongated oil-receivers $c'$, adapted to catch the drip of oil from the oil-cup $e$. Said oil after serving to lubricate said eccentrics dripping into said filtering-box, as before stated, becomes a part of the general circulation, flowing into the distributing-reservoir and coming into contact with the rotating crank-disk, whereby it is again thrown over the guides and working parts of the engine and collected in the collecting-reservoir $o^3$ and flowing through the pipe $o^4$, returning again into the filtering-box to be filtered, as stated.

Reserving the right in the practice and use of my device to make all changes as fall fairly within the scope of my invention, what I claim, and desire to secure by Letters Patent, is—

1. In combination with a steam-engine, an open filtering collecting and separating box, eccentrics mounted above said filtering-box that the drip or waste of lubricating-oils therefrom will drip into said box, a distributing-basin and means for conducting oil from said box to said distributing-basin as set forth.

2. In combination with a steam-engine a collecting filtering and separating box, eccentrics mounted and operating above said filtering-box that the drip or waste of lubricating-oil from said eccentrics will drip into said box, a distributing-basin, means for conducting oil from said filtering-box to said distributing-basin, a collecting-reservoir adapted to collect the waste or drip of oil from the working parts of the engine and means for conducting the oil thereby collected to the said filtering and separating box, whereby it is purified, filtered and cooled preparatory to being delivered to the distributing-basin for redistribution, as set forth.

3. In combination with a steam-engine a collecting, filtering and cooling box, a collecting-reservoir located within the crank-case at a higher level than said filtering-box, that oil may flow by gravity to said box and adapted to collect the drip or waste oil from the operating parts of the engine, a distributing-basin located at a lower level than said filtering-box that oil will flow by force of gravity to said basin, means for distributing the oil from said basin and eccentrics mounted over said filtering-box that waste oil will flow or drip from said eccentrics into said box, as set forth.

4. In a steam-engine having an inclosed crank-case, a reservoir or distributing-chamber at the bottom of said crank-case and a collecting-reservoir at a higher level and within said crank-case, a collecting, filtering and purifying box located outside of the engine-bed or crank-case and at a lower level than the collecting-reservoir and at a higher level than the distributing-chamber, and means for conducting the oil from the higher reservoir through the filtering-box to the lower reservoir or distributing-chamber, said filtering-box being located directly under the eccentrics.

5. In combination with a steam-engine, a filtering, purifying and separating box, a collecting-reservoir, placed at a higher level than said filtering-box, that the waste oil collected by said reservoir will flow by gravity into said filtering-box to be refiltered, a distributing-basin at a lower level than the oil-discharge from said filtering-box and a separating-trap for separating and discharging the water of condensation that may accumulate in the bottom of said box; substantially as set forth.

6. In combination with a steam-engine a collecting, filtering and separating box, having screens arranged and adapted to receive and hold a filtering material and an adjustable tube having an opening or outlet below the top of said box, said tube passing down through the screen and provided with means for vertically adjusting said tube for the purpose of retaining the oil at a certain height, as specified.

In testimony whereof I have subscribed my name.

JAMES B. ALLFREE.

Witnesses:
  A. L. TEETOR,
  E. B. HETZEL.